L. T. LARSON.
BIRD HOUSE.
APPLICATION FILED FEB. 18, 1915.

1,169,409.

Patented Jan. 25, 1916.

Witnesses
Fred W. Ely
P. H. Pattison

Inventor
Louis T. Larson
By Mansell F. Mills
Attorney

THE COLUMBIA PLANOGRAPH CO., WASHINGTON, D. C.

UNITED STATES PATENT OFFICE.

LOUIS T. LARSON, OF STANTON, IOWA.

BIRD-HOUSE.

1,169,409.

Specification of Letters Patent.

Patented Jan. 25, 1916.

Application filed February 18, 1915. Serial No. 9,014.

*To all whom it may concern:*

Be it known that I, LOUIS T. LARSON, a citizen of the United States, residing at Stanton, in the county of Montgomery and State of Iowa, have invented certain new and useful Improvements in Bird-Houses, of which the following is a specification.

This invention relates to bird houses, and more particularly to a bird house which is adapted to be supported from a tree or building or the like.

The invention has for one of its objects to provide a house for birds of the smaller species which will protect them from the larger birds of prey.

A further object of the invention is to provide a house the interior of which is protected from rain.

A further object of the invention is to construct a bird house in which means is provided to drain any water which may gain access to the interior thereof.

A further object of the invention is to provide a bird house which is well ventilated.

Figure 1:
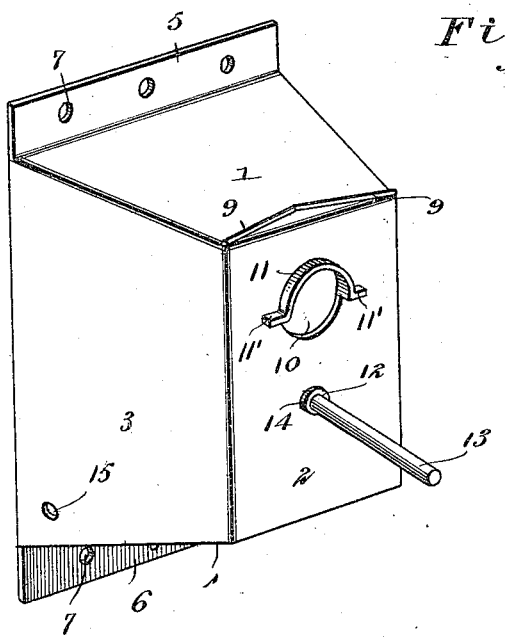
Figure 2:
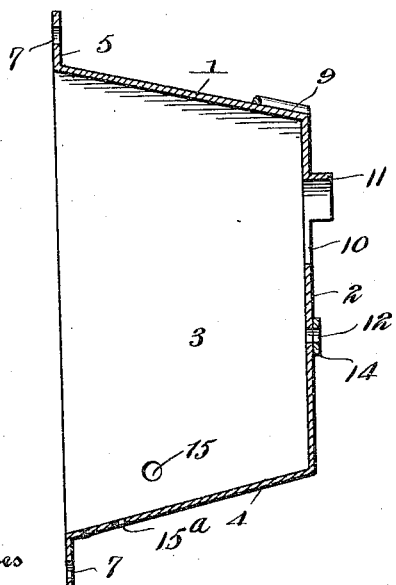

Referring to the drawings; Figure 1 is a perspective view of the bird house, and Fig. 2 is a vertical sectional view thereof.

Referring more particularly to the drawings, the invention comprises a metallic box having a top 1, a front wall 2, side walls 3, and a bottom wall 4. The box is preferably cast to the shape shown in the drawings, and cast integral with the top 1 and the bottom 4 are flanges 5 and 6 respectively each of which is provided with a series of openings 7. These flanges 5 and 6 form means by which the box is secured to a suitable support.

The top 1 of the box is formed with water shedding ridges 9 which convey the water to the sides thereof preventing it from dripping down on the front wall 2.

Near the upper edge thereof, the front wall 2 is provided with a circular opening 10 which permits of ingress and egress to and from the interior of the box. Bounding the upper half of the circular opening is a flange 11 which has laterally projecting ends 11' and acts as a water shed for said opening, this flange being formed by metal provided in the stamping out of the opening 10.

Below the opening 10 is a smaller opening 12 for the reception of a perch 13 which is inserted thereinto, this opening being bounded by a circular washer or the like 14 which serves as a support for the inner end of the perch 13.

The side walls 3 of the box are provided with openings 15 for ventilation of the interior of the box, and as shown in Fig. 2 the bottom of the box is provided with similar drain openings 15$^a$.

The rear of the box is left open, it being closed by the abutment of its edges with the support to which it is attached.

Having thus described my invention what I claim as new, and desire to protect by Letters Patent is:

A bird house comprising a box open at the rear and having its top and bottom relatively inclined, flanges integral with the top and bottom of said box, a front wall provided with a circular opening, means formed by bending outward a portion of the edge of said circular opening terminating with laterally projecting ends for excluding water from the circular opening, and means in the shape of an inverted V, integral at the top thereof for shedding water to both sides of the front wall.

In testimony whereof I affix my signature in presence of two witnesses.

LOUIS T. LARSON.

Witnesses:
L. V. E. PETERSON,
A. L. ANDERSON.

Copies of this patent may be obtained for five cents each, by addressing the "Commissioner of Patents, Washington, D. C."